(12) United States Patent
Meraz et al.

(10) Patent No.: US 11,294,263 B2
(45) Date of Patent: Apr. 5, 2022

(54) COLLAPSIBLE LIGHT MODIFIER

(71) Applicant: VITEC IMAGING SOLUTIONS UK LTD., Richmond (GB)

(72) Inventors: Diana Meraz, Nottinghamshire (GB); Matthew Bailey, Leicestershire (GB)

(73) Assignee: VITEC IMAGING SOLUTIONS UK LTD, Richmond (GB)

( * ) Notice: Subject to any disclaimer, the term of this patent is extended or adjusted under 35 U.S.C. 154(b) by 0 days.

(21) Appl. No.: 17/270,918

(22) PCT Filed: Sep. 11, 2019

(86) PCT No.: PCT/EP2019/074169
§ 371 (c)(1),
(2) Date: Feb. 24, 2021

(87) PCT Pub. No.: WO2020/053247
PCT Pub. Date: Mar. 19, 2020

(65) Prior Publication Data
US 2021/0215998 A1   Jul. 15, 2021

(30) Foreign Application Priority Data
Sep. 12, 2018 (IT) .......................... 102018000008540

(51) Int. Cl.
*G03B 15/06* (2021.01)

(52) U.S. Cl.
CPC .................................... *G03B 15/06* (2013.01)

(58) Field of Classification Search
CPC ...................................................... G03B 15/06
See application file for complete search history.

(56) References Cited

U.S. PATENT DOCUMENTS

| | | | | |
|---|---|---|---|---|
| 6,474,021 | B2* | 11/2002 | Homeyer | A47D 7/002 49/57 |
| 10,620,506 | B2* | 4/2020 | Wehbe | G03B 15/06 |
| 2005/0088836 | A1 | 4/2005 | Lowe | |
| 2014/0022758 | A1* | 1/2014 | Shirilla | G03B 17/56 362/18 |
| 2014/0192510 | A1* | 7/2014 | Kim | F21V 7/18 362/16 |

(Continued)

FOREIGN PATENT DOCUMENTS

WO    9418496 A1    8/1994

*Primary Examiner* — Evan P Dzierzynski
(74) *Attorney, Agent, or Firm* — Volpe Koenig

(57) ABSTRACT

A collapsible light modifier includes a plurality of rods mutually interconnectable one after the other between a first terminal portion and an opposite second terminal portion to form a frame of the light modifier and which can be mutually disconnected to disassemble the frame, and a fabric connected to the frame. Each rod is bound to at least one adjacent rod by a binding element provided between each pair of adjacent rods so as to keep the rods bound to each other when the frame is assembled and when the frame is disassembled, and, both the said first and second terminal portion includes a first end, connected to a respective rod, and an opposite second free end. When the plurality of rods is mutually interconnected, the respective second ends of the first and the second terminal portion can be connected to each other in order to form a closed frame.

12 Claims, 2 Drawing Sheets

(56) References Cited

U.S. PATENT DOCUMENTS

2016/0109682 A1* 4/2016 Shen .................. G03B 15/06
                                                    359/871
2017/0115548 A1   4/2017 Pickard

* cited by examiner

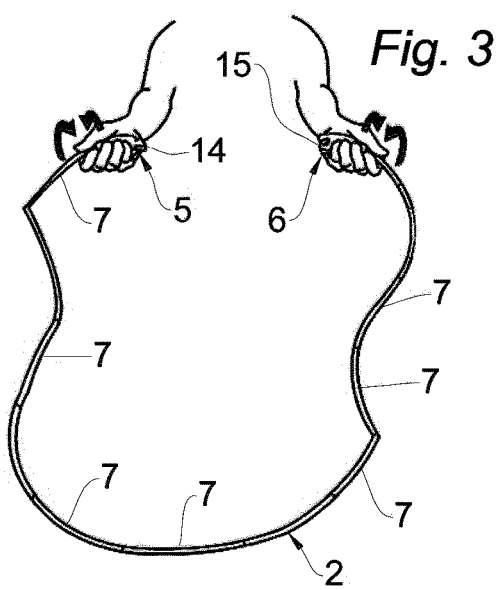
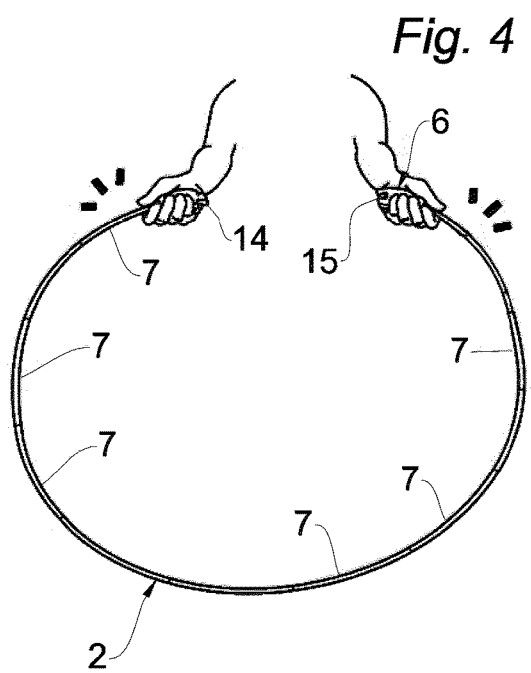
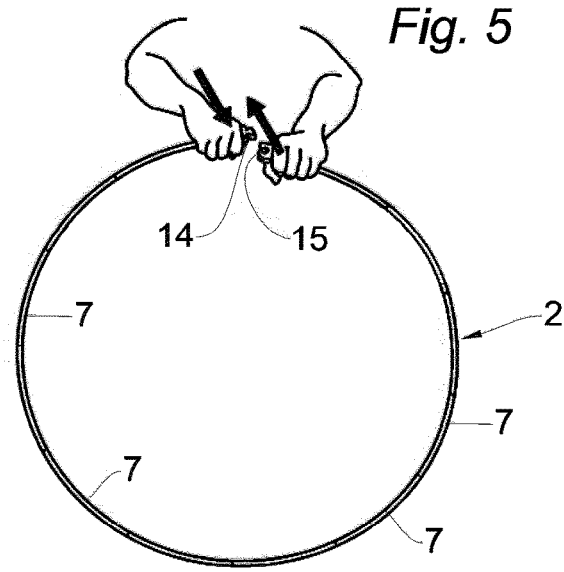
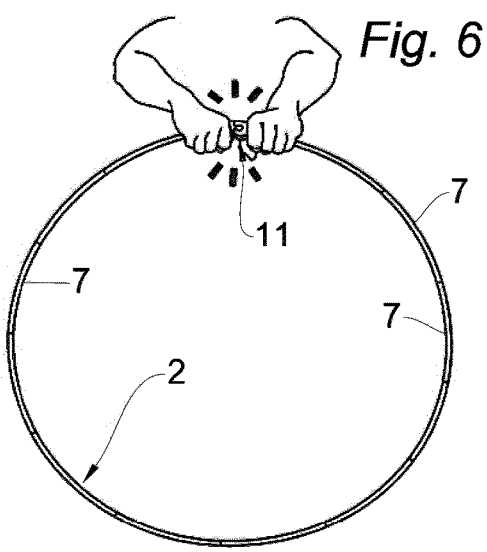
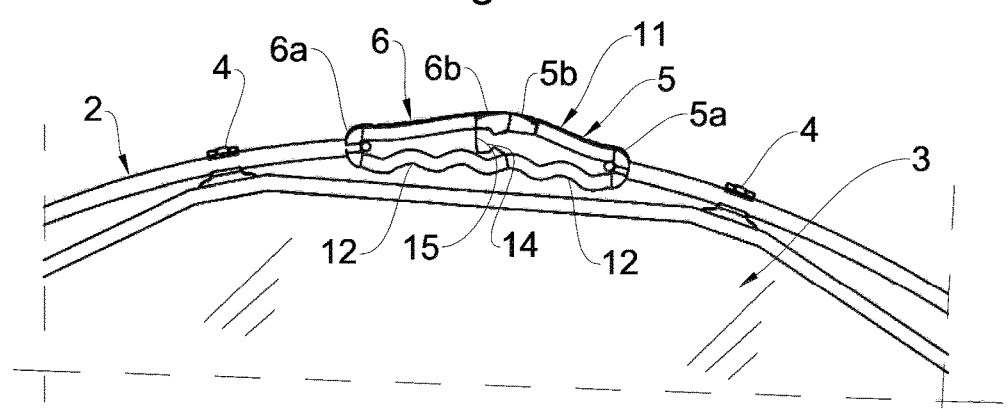

“COLLAPSIBLE LIGHT MODIFIER

TECHNICAL FIELD

The present invention refers to a collapsible light modifier for use in photography having the features outlined in the preamble of the main claim. In a preferred, but not exclusive, application, the present invention relates to a collapsible light modifier of planar and round configuration.

BACKGROUND ART

In the technical field of photography, in particular at professional level, use of devices able to modify the light emitted by a light source are a well-known way to generate a desired and specific light condition for a photo shoot.

A first example of light modifiers are light reflectors, which generally comprise a fabric of reflecting material supported on a peripheral frame of various shapes and configurations or a rigid panel of the same. They are generally planar and are intended to reflect light emitted by a light source towards the shooting environment.

A second example of light modifiers, also generally planar, are light diffusers, which are intended to soften the light directed towards the shooting environment.

These devices generally comprise a fabric of translucent material supported on a peripheral frame of various shapes and configurations, through which a light source is directed.

A third example of light modifiers are flags, which are intended to extract light from the shooting environment.

These devices generally comprise a fabric of extremely opaque material supported on a peripheral frame of various shapes and configurations or a rigid panel of the same. They are generally planar and are intended to block existing light in the shooting environment that may affect the lighting of a subject.

Light modifiers are common and near-essential tools for professional photographers and they are frequently moved from place to place (even during a photo shoot), and often handheld. However, they are quite cumbersome, so there exists a need to make these devices suitable for easy transportation and storage.

A known solution is to make light modifiers collapsible, so that the frame to which the fabric is fixed may be changed from an operative configuration, in which the frame is deployed for uses in photo shooting, to a non-operative configuration, wherein the volume of the frame is collapsed.

A first example of a collapsible light modifier, especially used in portable light reflectors, comprises a closed frame made of a single flexible linear member sewn into the fabric, which may be easily twisted in order to reduce its size. This flexible linear member is most often made of a tensile steel strip. However, this type of frame is only able to provide the light modifier with limited rigidity when the modifier is deployed in an operative configuration.

Another known example of a collapsible light modifier comprises a rectangular frame formed by a plurality of rods which can be mutually interconnected so as to assemble the frame. This solution allows to form devices of any rigid size, but is clearly time-consuming, both in assembling and in disassembling. Another drawback is that, when disassembled, the light modifier is formed by a number of many different and separate components which may be lost.

Another known example of a collapsible light modifier comprises a structure of four flexible rods whose ends may be connected to the corners of a fabric component in order to place it under tension, and which may be connected at the centre by a bracket. However, this type of structure is impractical for diffusers, as the structural members obstruct the light. Another drawback is that it is bulky and cumbersome, and when disassembled, the light modifier is formed by a number of many different and separate components which may be lost.

DISCLOSURE OF THE INVENTION

The main aim of the present invention is to provide for a collapsible light modifier which is structurally and functionally designed to overcome, at least in part, the drawbacks outlined above with reference to the cited prior art.

In particular, it is an aim of the invention to provide a collapsible light modifier which can be assembled and disassembled in a quick and easy manner.

Another aim is to provide a collapsible light modifier whose size is substantially reduced when disassembled.

Another aim is to reduce the possibility of losing components of the light diffusion box when disassembled.

Another aim is to help the user to assemble the collapsible light modifier properly.

Another aim is to provide a collapsible light modifier which is sufficiently rigid when assembled.

These and other aims are obtained by the present invention by means of a collapsible light modifier realised in accordance with the appended claims.

Therefore, in a first aspect thereof, the invention is related to a collapsible light modifier comprising a plurality of rods, which can be mutually interconnected one after the other between a first terminal portion and an opposite second terminal portion to form a frame of the light modifier, and which can be mutually disconnected to disassemble the frame, and a fabric connected to the frame.

Preferably, each rod of said plurality of rods is bound to at least one adjacent rod by a binding element provided between each pair of adjacent rods so as to keep the plurality of rods bound to each other when the frame is assembled and when the frame is disassembled.

Preferably, each of the first terminal portion and the second terminal portion comprises a first end, which is connected to a respective rod, and an opposite second end, which is separate and unbound to any rod or any other terminal portion.

Preferably, when the plurality of rods is mutually interconnected, the respective second ends of the first terminal portion and the second terminal portion can be connected to each other in order to form a closed frame.

Thanks to the above features, the light modifier according to the invention may be assembled easily and quickly, by connecting the rods one after the other in the order conveniently defined by the provision of the binding elements between subsequent rods.

The frame of the light modifier may be advantageously collapsed to a very reduced size, depending on the number and size of the rods. Indeed, it shall also be appreciated that the provision of the binding elements, will substantially avoid any possibility of losing elements necessary for the assembling of the frame, even when rods are numerous or short.

In addition, the rods may be conveniently rigid, so that the frame resulting from their interconnection will also result rigid enough for supporting its own weight and the weight of the fabric without appreciable deformations.

It shall also be noted that the provision of two terminal portions which may be connected to each other to close the frame improves the ability to design frames of different shapes, and in particular, frames having any round shape.

In the present description and in the annexed claims, the term "round" is intended to define any geometrical configuration which is substantially single-sided, such as circular or near-circular shape, oval or ovoid shape, elliptical shape, oblong shape.

In addition, the provision of two separate terminal portions, which can be independently moved by the user, will help a fast and proper interconnection between the rods.

In the above aspect, the present invention may have at least one of the preferred features indicated below.

The light modifier may be a light reflector, a light diffuser or a flag, depending on the characteristics of the fabric.

Preferably, the second end of one between the first and the second terminal portions comprises a projection and the second end of the other between the first and the second terminal portion comprises a recess which is so shaped as to receive the projection and to interlock the first terminal portion with the second terminal portion.

In this way, the connection of the two terminal portions which forms the closed frame may be carried out quickly by the operator, using only the geometrical features of the second ends of the terminal portions and without the need for tools.

In a most preferred embodiment, the projection and the recess are so shaped to form a dovetail interlocking.

Preferably, the recess has a bottom wall onto which the projection can rest when received in the recess.

The bottom wall closes the recess at one side of the second terminal portion, so that the projection may be inserted into the recess in one direction only and always up to the right position, so that the first terminal portion is flush with the second terminal portion. In addition, the provision of the bottom wall in the recess makes the whole coupling steadier.

Preferably, the first terminal portion and the second terminal portion, when connected to each other, form a handle of the light modifier.

In this way, the terminal portions are conveniently used to form a useful element of the light modifier and, at the same time, they do not need to be specifically shaped to allow the fabric to be attached on them.

In a preferred embodiment, all rods are curvilinear so as to form a closed frame which is round.

In particular, the closed frame may be circular, elliptical or oval.

In a most preferred embodiment, the closed frame is planar.

It should be noted that these type of geometrical configurations would be very difficult to assemble and disassemble without the provision of connectable terminal portions, which allow first the assembly of an open frame (by interconnecting the plurality of rods) and then the formation of a closed frame, (by connecting the two terminal portions).

Preferably, a threaded seat is provided on the first terminal portion or in the second terminal portion.

In this way the frame may conveniently attached to an external support, for instance a stand or a tripod.

Preferably, all rods forming the frame of the light modifier are provided with a binding element extending between them.

Preferably, each rod is internally hollow and the binding element extends axially through the open ends thereof.

More preferably, the binding element is extended from the first end of the first terminal portion to the first end of the second terminal portion, passing through the plurality of rods.

This feature allows an easy realization of the frame, because only one binding element may be used and this may be fixed only at its two opposite ends (to the respective first ends of the two terminal portions), after being threaded through the hollow rods.

In addition, the binding element acts as a guide for the respective ends of each pair of adjacent rods, so that they may be properly connected to each other very quickly, thus speeding up the assembly operation.

Preferably, the binding element is an elastic string, which urges each of said pairs of adjacent rods in mutual connection when the frame is in assembled configuration.

Thanks to this feature, the connection between the rods is tighter and the whole frame steadier.

In the present description and in the annexed claims, the term "string" is meant to indicate an elongated element with low modulus and high flexibility. Examples of elongated elements comprised in the above definition are cords, ribbons, bands, twines, threads and ropes.

Preferably, each pair of adjacent rods is mutually interconnected by means of male-female coupling, formed by a first end of one rod which is inserted axially into a second end of the adjacent rod.

In a particular preferred embodiment, each rod has a constant cross section apart from said first end which has a smaller cross section than the remaining part of the rod.

Preferably, the fabric is connected to the frame by means of fastening elements which can slide along the frame, between a deployed configuration and a compact configuration.

In this way, it is not necessary to disconnect all the fastening elements to move the fabric from the deployed configuration to the compact configuration, which is used for transport and storage of the light modifier.

More preferably, the fastening elements comprises clips, which are removably attached to the frame.

In this way, the connection of the fabric, or of a part thereof, to the frame is easy and quick. This will advantageously allow the interchanging of fabrics, so that a user may swap between one type of reflector to another, or he may switch to a diffuser or flag.

BRIEF DESCRIPTION OF THE DRAWINGS

The features and advantages of the invention will be more apparent from the detailed description of a preferred embodiment thereof, provided solely by way of a non-limiting example, with reference to the accompanying drawings in which:

FIGS. 2 to 6 are schematic views of the frame of the collapsible light modifier of FIG. 1, from the disassembled configuration to the assembled configuration; and FIGS. 7 and 8 are schematic view of respective particulars, in enlarged scale, of the light modifier of FIG. 1.

PREFERRED EMBODIMENT OF THE INVENTION

In the appended figures, a collapsible light modifier realised in accordance with the present invention is indicated, as a whole, with the reference number 1.

Figure 1:
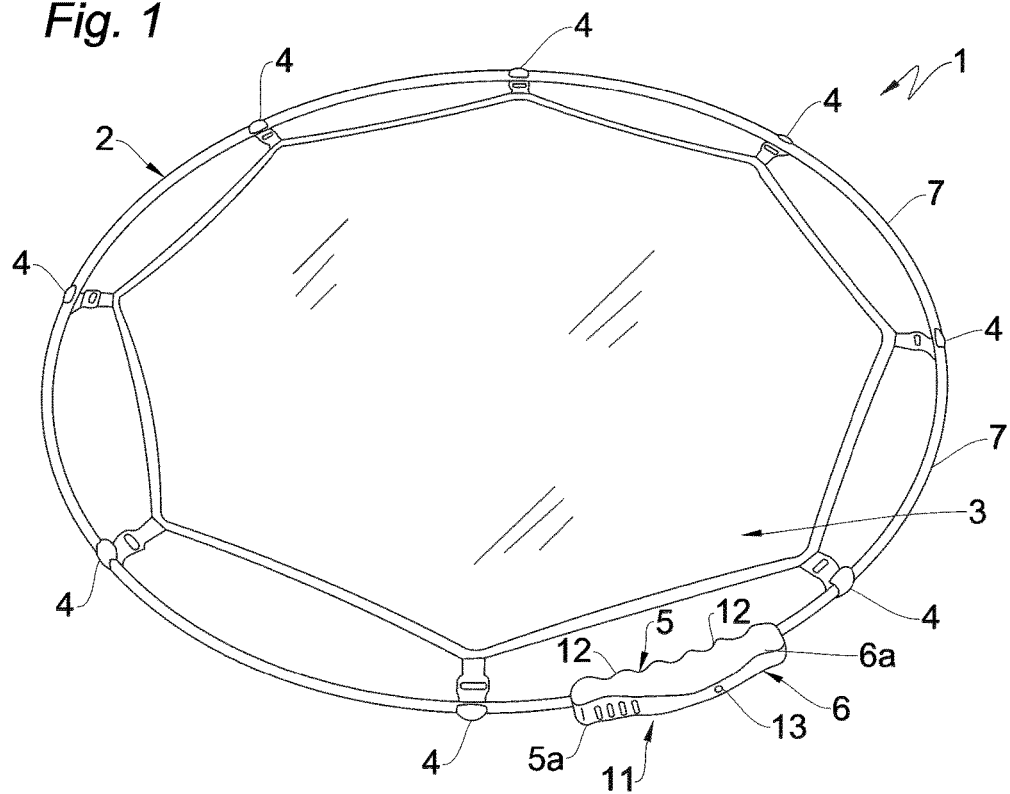
FIG. 1 is a schematic view of a collapsible light modifier realised in accordance with the invention, in deployed configuration.

In FIG. 1, the light modifier 1 is shown in deployed configuration, suitable for use in a photo shoot.

The light modifier 1 is a light reflector and when in deployed configuration, it has a planar and circular shape.

In other embodiments, the light reflector may be a light diffuser or flag and may have any other convenient shape, such as elliptical, oval or squared.

The lighting modifier 1 comprises a frame 2, which provides for the structural support to the light modifier, and a fabric 3, removably connected to the frame 2, by means of fastening elements 4.

The frame 2 comprises a first terminal portion 5, a second terminal portion 6 as well as a plurality of rods 7, mutually connected one after the other from the first terminal portion 5 to the second terminal portion 6.

In particular, the first terminal portion 5 comprises a first end 5a, firmly fixed to a rod 7, and an opposite second end 5b, which is free, not bound or connected to any rod or to the second terminal portion 6.

Analogously, the second terminal portion 6 comprises a first end 6a, firmly fixed to a rod 7, and an opposite second end 6b, which is free, not bound or connected to any rod or to the first terminal portion 5.

The first terminal portion 5 and the second terminal portion 6 are preferably made of plastics and the respective first ends 5a, 6a are fixed to respective rods 7 which begin and terminate the plurality of rods 7 forming the frame 2.

Rods 7 are preferably made of a rigid or semi-rigid material such as aluminium or composite material.

Preferably, all rods 7 have substantially the same length and the same curvature, forming respective arches of the circular frame 2.

All rods 7, apart the two rods fixed to the first and second terminal portions 5 and 6, have a first end 8 and a second end 9, axially opposite the first end 8.

Each pair of adjacent rods 7 is mutually interconnected by means of male-female coupling, formed by the axial insertion of the first end 8 of one rod 7 into the second end 9 of the adjacent rod 7.

All rods 7 are preferably hollow, with a circular cross section of constant diameter along the rod, apart from the first end 8 which has reduced cross section allowing its insertion in the second end 9 of the adjacent rod.

In particular, the first end 8 has cross section equal to the diameter of the remaining part of the rod reduced by the thickness of the wall of the rod at the second end 9.

According to a preferred embodiment of the present invention, all rods 7 are bound to the adjacent rods by a binding element 10 which keeps rods 7 bound to one another both when the frame is assembled and when the frame is disassembled.

In particular, the binding element 10 is extended from the first end 5a of the first terminal portion 5 to the first end 6a of the second terminal portion 6 passing through all the rods 7.

Preferably, the binding element 10 is an elastic string, having such a length and elastic module as to urge rods 7 in mutual engagement, but, at the same time, to allow their disengagement when sufficient pulling force is exerted by the user between two adjacent rods.

The first terminal portion 5 and the second terminal portion 6 are connected to each other by means of dovetail coupling, formed by a dovetail shaped projection 14 provided at the second end 5b of the first terminal portion 5 and by a corresponding recess 15 provided at the second end 6b of the second terminal portion 6 for receiving, in engagement, the projection 5a.

Figure 8:
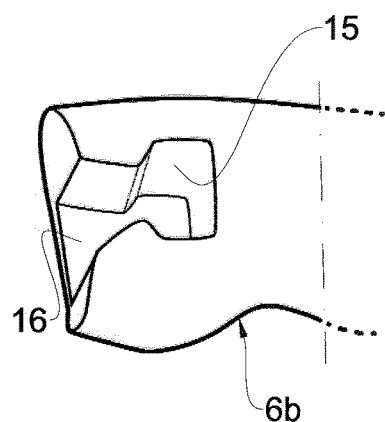

At one side thereof, the recess 15 is closed by a bottom wall 16, on which the projection 14 rests when received in the recess 15 (see FIG. 8).

The first terminal portion 5 and the second terminal portion 6 may therefore be interlocked to each other directly by the user without any tools.

In addition, the first terminal portion 5 and the second terminal portion 6 are so configured as to form a handle 11 of the light modifier 1 when connected to each other.

In particular, the first terminal portion 5 and the second terminal portion 6 are thicker than rods 7 and have also recesses 12 on the side intended to face the inner part of the light modifier 1 (for instance the fabric 3) so as to allow the user to grasp the handle 11 comfortably and, at the same time, firmly.

Preferably, in the first terminal portion 5, or in the second terminal portion 6, a threaded seat 13, suitable to receive in engagement a standard screw from a tripod or a stand, is also provided.

Figure 2:
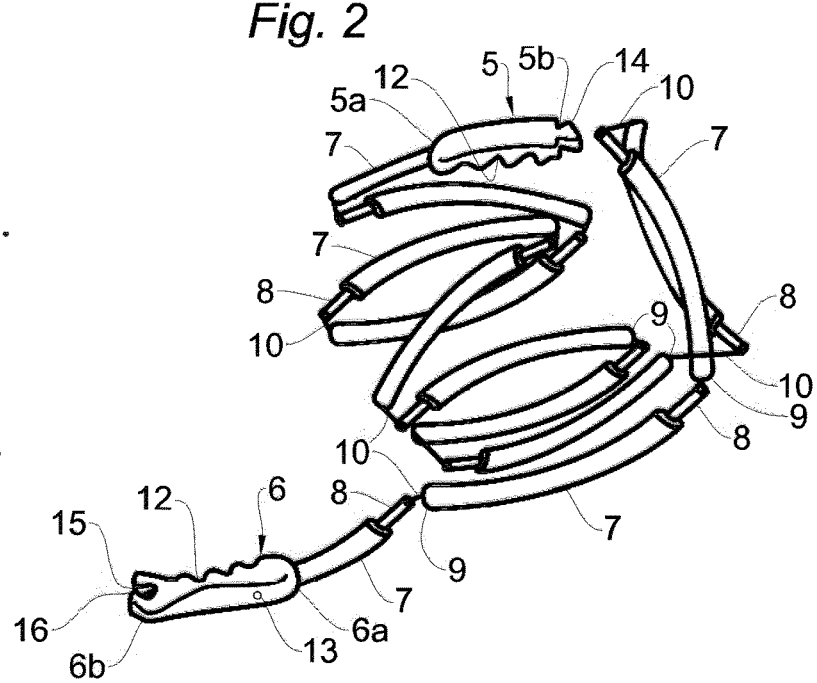

Fabric 3 may be made in any convenient manner and material and is connected to the frame 2 by means of fastening elements 4, which can be moved between a deployed configuration (FIG. 1) and a compact configuration (FIG. 2).

Preferably, the fastening elements 4 are in the form of clips, which can be easily coupled with and uncoupled from the frame 2 and which, when attached to the frame, can easily slide along the rods 7.

The light modifier 1 may be collapsed by the user from the deployed configuration shown in FIG. 1 to a compact configuration in which the light modifier is disassembled, so as to reduce its encumbrance, making it more suitable for transport and storage purposes.

Both assembling and disassembling of the light modifier 1 are carried out very quickly and easily, as better described in the following.

In FIG. 2, the light modifier 1 is shown with the frame 2 in disassembled configuration and the fabric 3 removed from the same (and not shown, for clarity).

In the disassembled frame 2, the first and second terminal portions 5, 6 as well as all rods 7 are disconnected, but they are all bound by the binding element 10, so that they cannot be lost.

To assemble the frame 2, the user may grasp the first and the second terminal portions 5, 6 with his hands, and move the same (possibly gently shaking the same, if necessary, see FIG. 3) so as to help the self-coupling between adjacent rods 7, which, also guided and urged by the elastic string which forms the binding element 10, connect to each other by inserting their respective first end 8 into the second end 9 of the adjacent rod (FIG. 4).

When all rods 7 are interconnected, the first terminal portion 5 and the second terminal portion 6 are also approached (FIG. 5) and easily connected by inserting the projection 14 into the recess 15 up to the bottom wall 16, thus closing the frame 2 and forming the handle 11 (FIG. 6).

Fabric 3 is then attached to the frame 2 by means of the clips 4 (FIG. 7), which can conveniently slide along the rods 7, which, when assembled, show a constant cross section along all of them.

The light modifier 1 is in the deployed operative configuration shown in FIG. 1 and may be supported and handled directly by the user or may be coupled to a proper stand or tripod, for instance using the threaded seat 13.

The disassembling operation of the light diffusion box 1, is carried out by uncoupling the clips 4, at least some of them, so as to allow the fabric 3 to slide along the frame 2.

Then the first terminal portion 5 is uncoupled from the second terminal portion 6 and, starting for example from the first terminal portion 5, rods 7 are also disconnected one after the other, by pulling each pair of subsequent rods so as to separate them and folding them on each other, up to the second terminal portion 6.

In this way, the size of the frame 2 is substantially reduced and the rods 7, still bound by the binding element 10, are packed in order without getting lost.

The fabric 3, pushed to the second terminal portion 6, may be used to wrap the rods 7 or, in the alternative, may be completely removed from the frame 2 by uncoupling all clips 4.

In this collapsed configuration, the encumbrance of the light modifier 1 is about $1/12^{th}$ of its encumbrance in deployed configuration, thus obtaining a great compaction of its volume.

Naturally, a person skilled in the art could apply additional modifications and variants to the above-described invention in order to comply with specific and contingent application requirements; these variants and modifications are nevertheless included within the scope of protection as defined by the appended claims.

The invention claimed is:

1. Collapsible light modifier comprising:
   a plurality of rods (7), which can be mutually interconnected one after the other between a first terminal portion (5) and an opposite second terminal portion (6) to form a frame (2) of said light modifier and which can be mutually disconnected to disassemble said frame (2), and
   a fabric (3) connected to the frame (2),
   wherein each rod (7) of said plurality of rods is bound to at least one adjacent rod by a binding element (10) provided between each pair of adjacent rods so as to keep said plurality of rods (7) bound to each other when the frame is assembled and when the frame is disassembled,
   wherein each of said first terminal portion (5) and said second terminal portion (6) comprises a first end (5a, 6a), which is connected to a respective rod, and an opposite second end (5b, 6b), which is separate and unbound to any rod or any other terminal portion, and
   wherein, when said plurality of rods is mutually interconnected, said respective second ends (5b, 6b) of said first terminal portion (5) and said second terminal portion (6) can be connected to each other in order to form a closed frame (2).

2. The collapsible light modifier according to claim 1, wherein the second end (5b, 6b) of one between the first and the second terminal portion comprises a projection (14) and the second end of the other between the first and the second terminal portions comprises a recess (15) so shaped as to receive the projection (14) and to interlock said first terminal portion (5) with said second terminal portion (6).

3. The collapsible light modifier according to claim 2, wherein said recess (15) has a bottom wall (16) onto which said projection (14) rests when received in the recess (15).

4. The collapsible light modifier according to claim 1, wherein said first terminal portion (5) and said second terminal portion (6), when connected to each other, form a handle (11) of said light modifier.

5. The collapsible light modifier according to claim 1, wherein said rods (7) are curvilinear so as to form a closed frame (2) which is planar and round.

6. The collapsible light modifier according to claim 1, wherein each rod (7) is internally hollow and said binding element (10) extends axially through the open ends (8, 9) thereof.

7. The collapsible light modifier according to claim 6, wherein said binding element (10) is extended from said first end (5a) of said first terminal portion (5) to said first end (6a) of said second terminal portion (6) through said plurality of rods (7).

8. The collapsible light modifier according to claim 1, wherein said binding element (10) is an elastic string which urges each of said pairs of adjacent rods (7) in mutual connection when the frame is in an assembled configuration.

9. The collapsible light modifier according to claim 1, wherein each pair of adjacent rods (7) is mutually interconnected by a male-female coupling, formed by a first end (8) of one rod which is inserted axially into a second end (9) of the adjacent rod.

10. The collapsible light modifier according to claim 9, wherein each rod (7) has a constant cross section apart from said first end (8) which has a smaller cross section than the remaining part of the rod.

11. The collapsible light modifier according to claim 1, wherein said fabric (3) is connected to the frame (2) by fastening elements (4) which can slide along the frame, between a deployed configuration and a compact configuration.

12. The collapsible light modifier according to claim 1, wherein said fastening elements (4) comprises clips, which are removably attached to the frame (2).

* * * * *